Patented Aug. 28, 1928.

1,682,241

UNITED STATES PATENT OFFICE.

WALTER A. PATRICK, OF BALTIMORE, MARYLAND, ASSIGNOR TO THE SILICA GEL CORPORATION, OF BALTIMORE, MARYLAND, A CORPORATION OF MARYLAND.

METHOD OF MAKING ALUMINUM-OXIDE GELS.

No Drawing. Original application filed February 18, 1921, Serial No. 446,108. Divided and this application filed May 24, 1924. Serial No. 715,729.

The present application which is a division of my application 446,108 filed February 18, 1921, relates to a method of making an adsorbent and catalytic gel of aluminum oxide.

In my Patent 1,297,724 for silica gel and process of making the same I disclosed and claimed a new method of producing hard porous highly adsorbent gels. The specific example mentioned in the patent is silica gel.

Prior to my patent the only known way of producing gels employed the slow and impractical step of dialysis. This was a laboratory method and would never have permitted the manufacture of gels in such quantities and cheap enough, so that they could be employed in the arts. My patent above mentioned describes how to avoid this step and manufacture gels cheaply and quickly so that they can be utilized in many fields.

The present invention relates to another species of the invention disclosed in the patent. More specifically, it is directed to a method of producing the gel of aluminum oxide either as such or in combination with one or more of the oxides of titanium, tungsten or tin.

The principal object of the invention is to produce a gel of aluminum oxide either alone or combined with other colloidal oxides possessing great adsorbing powers, and by a method which is commercially practicable.

For the method of the present invention, I carefully determine the concentrations of an acid solution and a solution of a soluble salt, such as a sodium salt of the acid of aluminum oxide, such that when mixed, will set to a hydrogel within four or five hours after mixing. Great care must be exercised in bringing the acid and salt solutions together, in order to avoid a rapid coagulation. To prevent this coagulation it is necessary to vigorously stir the solutions at the moment of mixing. The amounts of the salt solution and the acid solution used are such as to give a final concentration of the H ions coming from the acid in the mixture varying between one-tenth and five-tenths mols per litre. The salt solution should be of a concentration of from 3% to 7% by weight. Care should be taken to add the salt solution to the acid solution, or to bring them together simultaneously. If the acid solution is added to the salt solution the result will be a failure.

Thus for the production of aluminum oxide gel, a 3% to 7% solution of sodium aluminate is added to an acid solution, for example hydrochloric or sulphuric acids, until the concentration of the hydrogen ions coming from the acid in the mixture is from one-tenth to five-tenths mols per litre, and preferably about one-tenth to two-tenths mols per litre. The sodium aluminate and acid solutions are thoroughly stirred at the time of mixing to prevent premature coagulation. The mixture sets to a hydrogel in a short time and is then broken into pieces and moisture removed as directed hereinafter.

The temperature of the solutions during the time of mixing and setting is an important factor in the time required for the setting of the hydrogel. At a temperature of about 50° C. the mixture sets to a hydrogel in thirty minutes to one hour and the product is just as good as the gel formed by mixing the solutions at a lower temperature but requiring a considerably longer time to set. Usually solutions at the time of mixing and at the time of setting are at atmospheric temperature but satisfactory results may be obtained at temperatures from 15° C. to 80° C. On mixing the acid and the soluble salt solutions, a colloidal solution of the acid corresponding to the oxide is first formed. It is from this solution that the compound sets to a hydrogel. The hydrogel which is formed by allowing the mixture to set is then broken into pieces and washed free from acid and salt. If the wash water is heated this step is expedited. The washed hydrogel must now have its moisture removed to obtain the hard gel. When this is effected by drying, it is essential that the water be removed slowly, as the resulting finely porous condition of the gel obtained depends upon the proper drying of the hydrogel. To this end the hydrogel is first dried in a stream of air at 75° C. to 120° C. After this heating the gel will still contain a considerable quantity of water and the greater part of this is driven off by increasing the temperature slowly up to 300° C. to 400° C. It may, however, be dried at 120° C. but this will take longer. In a general way it may be said that not all the water should be driven out of the gel.

The resulting product is a most stable substance which can be safely heated to relatively high temperatures such as 700° C. without fear of injury. The method of drying may be modified by taking the material after the first heating step as above described, and subjecting the same to a vacuum to further remove the water, the temperature during this vacuum treatment being from 75° C. to 120° C. The product obtained by this method is just as stable as if the water had been removed by a further heating up to 300° C. to 400° C. The gel which is dried in a vacuum is also stable to relatively high temperatures, such as 700° C.

The final product is a hard, transparent substance very closely resembling glass in appearance. When prepared in the above manner it is very porous, the pores being ultra-microscopic and of exceedingly fine dimensions. It is because of this fine porous structure that the gel is such an efficient adsorbing medium. The hardness which the gel possesses is a desirable property for the reason that the gel will retain its shape and structure and not crumble or pack when placed in a vessel for the purpose of adsorbing fluids.

In the foregoing description it was stated that a solution of the sodium salt of the acid corresponding to the oxide is employed. It is to be understood, however, that any soluble salt of the acid corresponding to the oxide may be employed. The gel prepared in accordance with this invention, in addition to being an efficient adsorbent of fluids, also possesses marked catalytic activity.

By mixing solutions of a soluble salt of the acid of aluminum oxide and soluble salt of the acid of one or more of the oxides of titanium, tungsten or tin, a gel will be obtained which may be termed a plural oxide gel. The concentrations and quantities of the solutions are determined as already described, and the hydrogel formed by the mixture may have its moisture removed by drying as previously set forth. In this manner plural gels of any number of combinations of said oxides may be obtained. For example a plural gel of aluminum oxide and tungstic oxide may be obtained by mixing with vigorous stirring 3% to 7% solutions by weight of sodium aluminate and sodium tungstate and a solution of an acid, for example hydrochloric until the hydrogen ions in the mixture have a concentration of one-tenth to five-tenths mols per litre. Then the mixture is allowed to set to a hydrogel, broken into pieces and dried as described herein.

Having thus described the invention what is claimed as new and desired to be secured by Letters Patent is:

1. In the process of preparing aluminum oxide gel, the step of adding with thorough stirring a 3% to 7% solution of a soluble aluminate to an acid solution, the amounts of the aluminate and acid solutions and the concentration of the acid solution being such that the final concentration of the H ions resulting from the acid in the mixture is from one-tenth to five-tenths mols per litre.

2. In the process of preparing aluminum oxide gel, the step of adding with thorough stirring a soluble aluminate solution to an acid solution, the amounts and concentrations of said solutions being such that the final concentration of H ions resulting from the acid in the mixture is from one-tenth to five-tenths mols per litre.

3. The process of preparing aluminum oxide gel consisting in adding with thorough stirring a soluble aluminate solution to an acid solution, said solutions being of such concentrations and amounts that the final concentration of H ions resulting from the acid in the mixture is from one-tenth to five-tenths mols per litre, whereupon after a time the mixture will set to a hydrogel without removal of any of the excess acid and salt, thereafter washing said hydrogel to remove the acid and salt, and removing most of the water from the resulting product.

4. The process of preparing aluminum oxide gel consisting in adding with thorough stirring a 3% to 7% solution of sodium aluminate to a solution of an acid, the concentration of the acid and the amounts of the solutions being such that the final concentration of H ions resulting from the acid in the mixture is from one-tenth to five-tenths mols per litre, whereupon the mixture, after a time, sets to a hydrogel without removal of any of the excess acid and salt, washing the hydrogel to remove acid and salt, and removing most of the water from the resulting product.

5. The process of preparing aluminum oxide gel consisting in adding with thorough stirring soluble aluminate solution to an acid solution, said solutions being of such amounts and concentrations that the final concentration of H ions resulting from the acid in the mixture is from one-tenth to five-tenths mols per litre whereupon, after a time, the mixture sets to a hydrogel, washing said hydrogel to remove acid and salt, drying the hydrogel at a temperature of 75° to 120° C. to drive off a part of the moisture and then slowly increasing the temperature to drive off the greater part of the remaining moisture.

6. The process of preparing a plural oxide gel containing aluminum oxide consisting in adding with thorough stirring solutions of a soluble aluminate and soluble salts of the acids of the other oxides to an acid solution, the solutions being of such concentrations and amounts that the final concentration of H ions resulting from the acid in the mixture is from one-tenth to five-tenths mols per litre, whereupon, after a time, the mixture will set to a hydrogel without removal of any of the excess acid and salts, washing to remove acid and salts and drying to remove most of the water from the resulting product.

7. A plural oxide gel being a hard glassy material having ultra-microscopic pores, stable in the presence of air up to high temperatures, and consisting of aluminum oxide and one or more colloidal oxides.

8. In the process of preparing aluminum oxide gel, the steps of allowing a colloidal solution of aluminic acid to set to a hydrogel, drying the hydrogel in a current of air heated to 75° C. to 120° C. and then slowly increasing the temperature.

9. In the process of preparing aluminum oxide gel, the steps of allowing a colloidal solution of aluminic acid to set to a hydrogel, drying the hydrogel in a current of air heated to 75° to 120° C. and then slowly increasing the temperature to 300° to 400° C.

10. In the process of preparing aluminum oxide gel the steps of allowing a colloidal aluminic acid solution to set to a hydrogel, drying the hydrogel in a current of air heated to 75° to 120° C. and then slowly increasing the temperature to a point not exceeding 400° C.

11. In the process of preparing aluminum oxide gel, the steps of allowing a colloidal solution of aluminic acid to set to a hydrogel, drying the hydrogel in a current of air heated to 75° to 120° C., subjecting the gel to a vacuum and then further heating the gel.

12. The process of preparing a plural oxide gel containing aluminum oxide consisting in adding with thorough stirring 3% to 7% solutions of a soluble aluminate and soluble salts of the acids of the other oxides to an acid solution, the solutions being of such concentrations and amounts that the final concentration of H ions resulting from the acid in the mixture is from one-tenth to five-tenths mols per litre, whereupon, after a time, the mixture will set to a hydrogel without removal of any of the excess acid and salts, washing to remove acid and salts and drying to remove most of the water from the resulting product.

In testimony whereof I hereunto affix my signature.

WALTER A. PATRICK.